United States Patent
Bell

[15] 3,656,353
[45] Apr. 18, 1972

[54] VEHICLE SPEED SENSOR

[72] Inventor: Edward H. Bell, Hunterdon County, N.J.

[73] Assignee: Westinghouse Air Brake Company, Swissvale, Pa.

[22] Filed: Dec. 8, 1969

[21] Appl. No.: 882,873

[52] U.S. Cl. ................................... 73/493, 73/521, 73/527
[51] Int. Cl. ....................................................... G01p 3/26
[58] Field of Search ........................... 73/527, 493, 521, 523

[56] References Cited

UNITED STATES PATENTS

| 3,292,648 | 12/1966 | Colston | 73/523 X |
| 3,392,739 | 7/1968 | Taplin et al. | 73/521 UX |
| 3,409,032 | 11/1968 | Boothe et al. | 73/521 UX |
| 3,469,395 | 9/1969 | Spitzbergen et al. | 73/521 UX |
| 3,489,014 | 1/1970 | Przybylko | 73/521 X |
| 3,500,845 | 3/1970 | Bellman et al. | 137/81.5 |

FOREIGN PATENTS OR APPLICATIONS

| 933,018 | 7/1963 | Great Britain | 73/527 |

*Primary Examiner*—James J. Gill
*Attorney*—H. A. Williamson, A. G. Williamson, Jr. and J. B. Sotak

[57] ABSTRACT

Vehicle speed sensing apparatus in which vehicle movement is first translated into rotary motion by a sprocket wheel and chain arrangement which is engaged by the moving vehicle. A pressurized fluidic stream, specifically air, is pulsed by passage through slots in one sprocket wheel. The resulting fluid pulses are received by a collector tube and fed into a fluidic one-shot multivibrator unit for shaping into a succession of uniform duration pulses whose frequency varies directly in response to the varying speed of the vehicle. These pulses are converted into a time average pressure signal which is compared with a preselected bias pressure representative of a desired vehicle speed. The proportional output of this comparison actuates a fluidic flip-flop unit to its first or second condition as the vehicle speed is greater or less than, respectively, the desired speed. A first condition signal from the flip-flop actuates an OR-NOR gate to its OR condition and the resulting output signal may be used to actuate other apparatus to control the vehicle speed.

3 Claims, 2 Drawing Figures

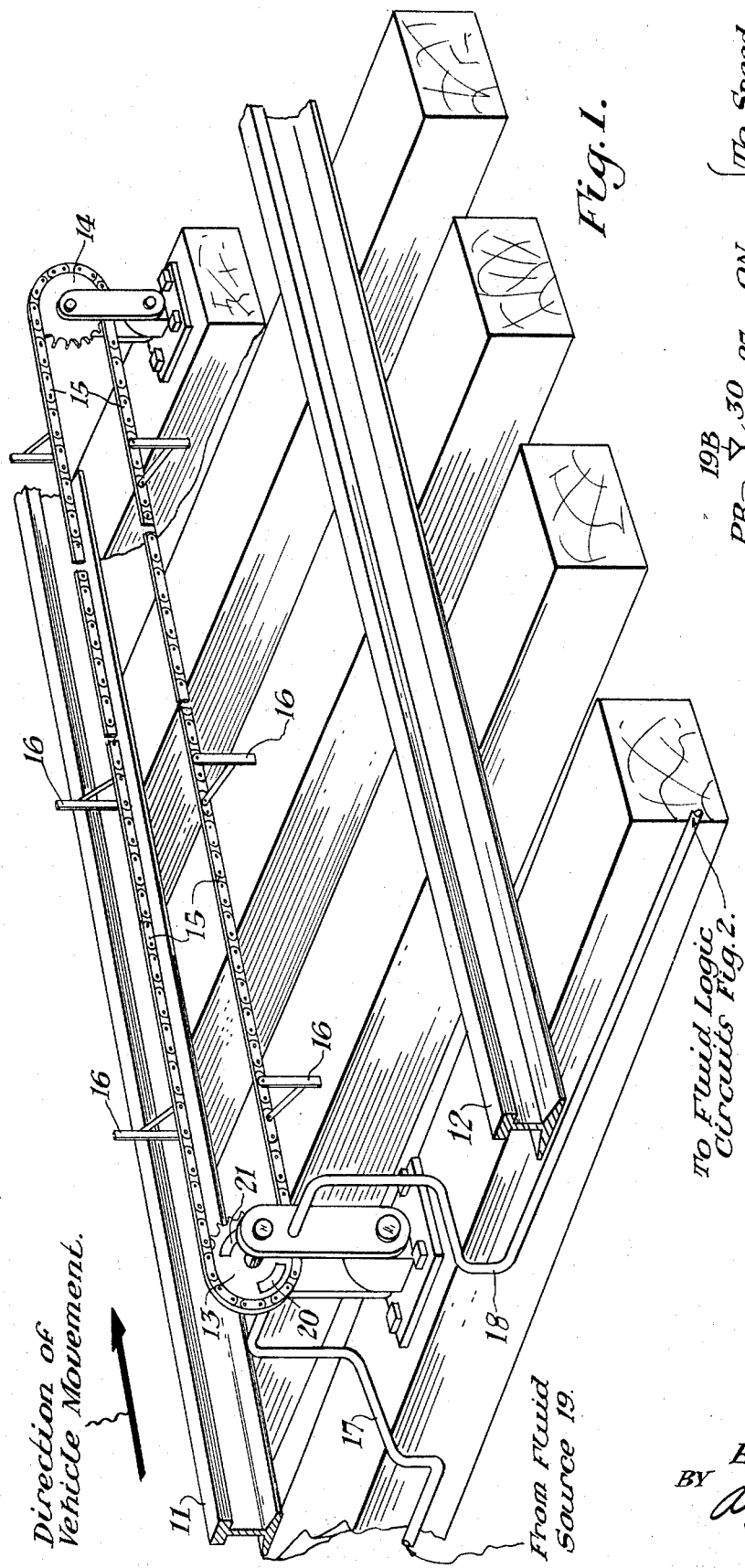

VEHICLE SPEED SENSOR

My invention relates to a wayside vehicle speed sensor. More specifically, this invention relates to a wayside arrangement of fluidic devices actuated by a source of fluid pressure in a variable manner in response to vehicle speed to determine whether that vehicle speed exceeds or is less than a preselected speed level.

Various wayside vehicle speed measuring devices are known and used, such arrangements being independent of any apparatus on the vehicle itself. One common type, especially in railroad classification yards, is radar speed measuring apparatus. However, these radar units are rather expensive and require highly skilled maintenance. Their cost can be justified only for large control installations where accurate speed measurements are required, and where such speed measurement signals must be interfaced with computer control apparatus. Other common speed measuring means using wayside detectors require rather complicated calculating and/or timing devices, and thus also are justifiable only in a relatively large installation of control apparatus. Various simple speed measuring means, either proposed or available, are not entirely satisfactory for some applications. One requirement for a small railroad classification yard control system is a means to determine the speed of a car which provides only a minimum determination that car speed is greater than or less than a preselected speed level. Such a speed measuring means should be relatively inexpensive, easily installed, and easily maintained. Also the contact or operating control between the car and the wayside apparatus should be relatively simple. By the use of fluidic devices and appropriate control connections, an inexpensive and simple speed measuring apparatus may be provided which is a feasible solution to the speed measuring requirements for controlling a small railroad classification yard and for other simple installations.

Accordingly, an object of my invention is a wayside vehicle speed sensor of a new and relatively simple design.

Another object of the invention is vehicle speed sensing apparatus incorporating fluidic devices.

A further object of my invention is a vehicle speed measuring arrangement for small railroad classification yards which is compatible for use with inexpensive speed control systems designed for such yards.

Still another object of my invention is a vehicle speed measuring means for railroad classification yards using an arrangement of fluidic devices controlled by a corresponding fluid pressure source which provides a variable signal output in response to the varying speed of car movements.

It is also an object of my invention to provide a vehicle speed measuring arrangement in which a pulse source, frequency responsive to the varying vehicle speed, drives an arrangement of devices for decoding the received pulses to determine whether the vehicle speed is greater than or less than a selected desired speed level.

It is also an object of my invention to provide a speed measuring means for railroad classification yards in which a fluid power source is pulsed at a rate directly proportional to the speed of cars moving along a railroad track and a fluidic logic arrangement is controlled by such pulses to determine whether or not the car exceeds a preselected desired speed level.

Other objects, features, and advantages of my invention will become apparent from the following description when taken in connection with the accompanying drawings.

In practicing the invention, I provide a transducing means to initially translate vehicle or car movement into a rotary motion. Specifically, this is illustrated as a sprocket chain looped around a pair of geared or sprocket wheels, this transducer arrangement being mounted along the right of way so that the chain is parallel to the direction of car movement. Lugs or brackets are mounted on the chain so as to be engaged by each passing vehicle. The resulting movement of the chain during the passage of a vehicle obviously causes the sprocket wheels to rotate. In order to further translate this rotary motion into readily useable signals proportional to vehicle speed, one of the sprocket wheels is slotted in a selected manner so that the passage of the slots in rotary motion past a particular point represents and is directly proportional to the vehicle speed. In the specific showing, an emitter tube device connected to a source of air pressure is situated to discharge a stream of air through the sprocket wheel slots as they are rotated past the selected point. The resulting interrupted air stream is received by a collector tube on the other side of the sprocket wheel. Obviously, this results in a series of pulses of air, or fluid in the broader sense, in the collector tube. These pulses of air are then supplied to a fluidic logic circuit arrangement, comprised of conventional, commercially available fluidic devices for decoding or interpretation to determine the relative level of the vehicle speed. The first element of the logic circuitry to receive the pulses of air shapes the fluid pulses so that only the frequency of the resulting pulses varies to represent the varying car speed. These pulses are then filtered to provide an output having a time averaged pressure level proportional to the frequency of the received pulses and thus to the speed of the vehicle.

This time averaged pressure signal or output is then balanced against a source of bias pressure, a compatible type of fluid, as herein air, the comparison being accomplished in a proportional amplifier device. The bias pressure level is preselected in accordance with a desired speed level at which the vehicle should be moving. This desired speed level is thus the determination point above and below which the speed of the car is measured. The output of the proportional device controls a fluidic flip-flop element which is set or conditioned to a first or second condition as the averaged pressure or the bias pressure is greater, respectively. The condition of the flip-flop element controls a fluidic OR-NOR gate in a manner that an output control signal, produced when the gate is in its OR condition, occurs when vehicle speed is above the desired level. The output condition of the OR-NOR gate thus obviously indicates if the car speed is greater than or less than the selected speed level. The output signal may then be used to control a wayside device, for example, a car retarder, which can reduce the car speed to the desired level.

I shall now describe in greater detail one specific arrangement embodying the vehicle speed sensor of my invention, referring from time to time to the accompanying drawings in which:

FIG. 1 is a schematic illustration of the transducer device for translating car movement into rotary motion and subsequently into fluidic signals, as used in one system embodying my invention.

FIG. 2 is a diagrammatic showing, using conventional symbols, of a fluidic logic circuit arrangement associated with the device of FIG. 1 to complete the speed sensing arrangement embodying my invention.

In each figure of the drawings, similar reference characters designate the same part of the apparatus.

Referring now to FIG. 1, there is illustrated one form of a transducer arrangement for translating vehicle movement into rotary motion as well as the interfacing arrangement between this rotary motion and the fluidic logic circuitry shown in FIG. 2. Specifically, the transducer is shown for translating the motion of a railroad car moving along a track as, for example, in a railroad classification yard. The rails 11 and 12 are mounted on the usual ties, as is well known. While the illustrated portion of the track may be in any part of the classification yard area, and particularly within a retardation zone, no other wayside apparatus is shown for simplicity's sake. Mounted on the ties between the rails are a pair of sprocket wheels 13 and 14 around which is looped a sprocket chain 15. These sprocket wheels may be classed as free wheeling, that is, there is no restraint on their movement except the normal amount of friction in the axle mountings. Attached to the chain at periodic intervals are brackets 16, commonly called flags, positioned to be engaged by the axles of cars moving along the track in the direction indicated by the arrow at the upper left of the figure. These brackets or flags may be designed to collapse when struck by a car moving in the opposite direction. The axle of a car moving in the normal direction thus moves the flag against which it rests and correspondingly the sprocket chain as the car traverses the stretch of track where this transducer element is mounted. Movement of the chain causes rotation of the sprocket wheels with their revolutions per minute being responsive to car speed in a directly proportional relationship. In other words, the movement of the chain in response to the movement of the car along the rails causes a rotary movement to the sprocket wheels, the speed of rotation being proportional to car speed and varying directly in response to any variation in the car speed.

Sprocket wheel 13 is the signal interrupt or signal pickup element and is thus the actual translator between the mechanical motion and the circuit logic which decodes the signals and determines the level of car speed. Actually there are several ways following the same basic concept in which this translation may be made. As specifically shown, wheel 13 is used to pulse the flow of a fluid pressure stream, which pulsing is decoded in the associated fluidic logic circuitry, as will be described. A pipe or tube 17 leads from a source 19 of fluid pressure which specifically, for convenience, is defined as being air under pressure. Tube 17 is therefore defined hereinafter as the emitter tube and, as schematically shown, is positioned to discharge or emit the air under pressure at one side of wheel 13 and perpendicular to its plane of rotation. Wheel 13 is slotted, as shown at 20 and 21, although the arrangement of my invention is not limited to only two slots in this sprocket wheel. This arrangement results in the periodic interruption of the air stream discharged by tube 17 into a series of pulses on the opposite side of wheel 13. A collector tube 18 is positioned to receive these pulses of air and deliver them to the fluidic logic circuitry shown in FIG. 2. Thus as the car moves along the track and at the same time causes the movement of the chain, wheel 13 is rotated and pulses of air are delivered from tube 17 into tube 18, the frequency of the pulses being proportional to the speed of the car. In other words, the faster the car moves along the track, the higher is the frequency of the pulses received in tube 18 although the pulses themselves at the higher speeds will be of shorter duration.

Referring now to FIG. 2, the fluidic logic circuitry associated with the transducer arrangement of FIG. 1 is shown using conventional symbols in a circuit diagram arrangement. Each of the fluidic units thus shown is available in commercial form. To provide an understanding of the interfacing, an end view of sprocket wheel 13 is shown at the left of FIG. 2. Positioned to the left of wheel 13 is the emitter tube 17 while to the right is the collector tube 18. Tube 18 is further positioned to receive the air from tube 17 when a wheel slot opens the space path between the two tubes. As previously mentioned, the general source of the air pressure for the pulses is designated and shown at 19. Each of the fluidic logic units is also provided with a source of operating air, designated in each case by the reference 19A. This is the same as source 19 but with whatever reduction in pressure level is required by the specific fluidic unit involved.

The pulses of air received by tube 18 are supplied to the first fluidic unit of the logic circuitry which is an integrated one-shot multivibrator device OS which may be of any commercially available type of such elements. This unit is provided with a source of operating air pressure designated 19A, as previously defined. This one-shot device has an input control port 22, an output port 23 normally pressurized in the absence of any pressure at input 22, and an output port 24 pressurized in initial response to the presence of a pressure pulse at the input port. This device also has a time delay feedback passage 25 which joins input 22 at a junction 26. When input port 22 is pressurized to switch pressure from output 23 to output 24, the feedback channel 25 is also pressurized at junction 26. After a predetermined time delay, governed by the length and volume of feedback channel 25, the input signal is fed back to oppose itself to depressurize output 24 and repressurize output 23, thus terminating the output pulse from unit OS to the next element in the logic circuitry. It will be understood that each output pulse at port 24 is thus always of the same time duration regardless of the length of the input pressure pulse at 22. This characteristic of the output is due to the inherent time delay characteristic built into feedback channel 25. Since source 19A provides all operating pressure for unit OS, each output pulse also has the same pressure level. Upon final termination of the input pulse at input 22, output 23 remains pressurized until another input pulse occurs.

The output pulses from port 24 of unit OS are supplied to the left or input port of a ladder filter device FI which is a fluidic element of conventional design. Unit FI coverts the input pulses into a time average pressure output at its right or output port. Since the input pulses are of uniform duration and have the same pressure level, the pressure level of this output signal increases as the input frequency increases, in a direct relationship. Thus as the speed of the vehicle increases and the frequency of the pulses created by wheel 13 becomes higher, the time averaged pressure output of ladder filter FI increases in a proportional relationship.

The next unit in the logic circuitry is the fluidic proportional amplifier device PR. This device includes a supply port to which pressure source 19A is connected, a pair of outputs 27 and 28, a first control input 29, and a second control input 30. Amplifier PR operates in a conventional fashion to proportionally divide the operating pressure from source 19A between its outputs 27 and 28 in accordance with the pressure differential between the input signals supplied to ports 29 and 30. The output of ladder filter FI is connected to control input port 29 of proportional amplifier PR so that the time averaged pressure signal is supplied as a first input. The supply from a pressure source 19B is connected to input port 30. This second pressure input serves as a bias pressure and represents the desired speed for a vehicle moving along the stretch of track shown in FIG. 1. It is to be understood that this is not necessarily a fixed bias pressure but may be preselected for each car. It will, however normally remain constant during the passage of any one car or group of cars. It is obvious that the bias pressure from source 19B thus operates as the point in the speed range about which the determination of the speed level for a particular car is made, this is, that car speed is greater or less than the preselected desired speed.

The outputs from amplifier PR are supplied to the opposite control inputs 32 and 33 of a fluidic flip-flop device FF. This device also has a supply port connected to source 19A and a pair of output ports 34 and 35. Device FF operates in a conventional manner to pressurize either output 35 or output 34 depending upon which of the control inputs 32 and 33, respectively, is provided with a predetermined preponderance of pressure over the other input port. The pressurized output port remains in that condition, even though both inputs become depressurized, until the opposite input port is provided with the preponderance of pressure, thus switching the device to pressurize the other output. In other words, when the preponderance of input pressure is applied to port 32, output port 35 is pressurized and continues in this condition, receiving pressure from supply 19A, even though both input ports become depressurized. Output pressure is not shifted to port 34 until a later condition occurs in which input port 33 is supplied with the greater pressure with the predetermined preponderance over the other input pressure.

The final unit in the apparatus is a conventional fluidic OR-NOR gate, designated ON, which has a supply port at the left connected to pressure source 19A. This unit has a NOR output port 36, an OR output port 37, and a pair of control inputs 38 and 39. When either of these input ports is pressurized, the NOR output port 36 is depressurized and pressure appears at the OR output port 37. For convenience, output port 35 of flip-flop device FF is connected to input port 39 of unit ON, although input port 38 can just as well be substituted for port 39 to obtain the same operational result. The OR output port 37 may then be connected to vehicle speed control apparatus in such a manner that the apparatus, when actuated by the OR output signal, will reduce the speed of the vehicle. For example, in the classification yard of which the track stretch shown in FIG. 1 is assumed to be a part, any type of car retarder speed control apparatus known in the classification yard art may be used. Depending upon the specific type of speed control utilized, it may also be necessary to provide a connection from the NOR output port 36.

I shall now describe the general operation of the arrangement embodying my invention in determining the speed of a car. It is first assumed that a car is moving along the stretch of track indicated by the rails 11 and 12 in FIG. 1 and that, for purposes of speed control, determination of its speed level is required. As this car moves along the track, one of its axles will engage a bracket 16 which causes chain 15 to move and actuate the rotation of sprocket wheel 13, the speed of rotation being in direct proportion to the speed of the car. As it rotates, the slots in wheel 13 periodically pass air from emitter tube 17 to collector tube 18, as shown in a schematic form in FIG. 1 and also illustrated in diagram form in FIG. 2. As these fluidic pulses, described as air, are received by tube 18, they are supplied to input port 22 of the one-shot unit OS. These received pulses are shaped by unit OS into a succession of output pulses at port 24. These output pulses have the same pressure level and are of constant width, i. e., uniform duration, depending upon the time characteristics of this one-shot unit. However, there is no change in the frequency rate of the pulses as received through tube 18 during the shaping process. Of course, the frequency of the pulses varies directly in response to changes in the car speed. It is to be noted that the duration of the output pulses will be normally less than the duration of the input pulses and will be uniform at all frequencies, which is typical of the operation of one-shot multivibrator units. This shaping is necessary since the input pulse width may vary even at a constant speed and it is the pulse frequency which is the critical characteristic for determining the speed level.

The series of uniform duration pulses at output port 24 of unit OS are applied to the input port of the ladder filter unit FI. The output from unit FI is a time averaged pressure signal whose level is a function of the input pulse frequency rate. Thus the level is also proportional to or representative of the speed of the car. This output pressure signal varies, of course, as the car speed varies as it moves along the track. The output pressure signal from unit FI is applied to input port 29 of the proportional amplifier PR in opposition to the bias pressure signal from source 19B. In the specific example herein assumed, the signal received from source 19B is representative of the desired speed of the car which is to be obtained by speed control means as this car moves along the stretch of track. The pressure signal from source 19B may be different for each car moving along the track in accordance with various external factors, for example, in accordance with the condition of the car and its rolling characteristics and the conditions of the classification yard in which the stretch of track may be located. The output from unit PR will be greater at port 27 or at port 28, respectively, as the pressure signal received from unit FI is greater than or is less than the bias pressure signal received from source 19B. In the characteristic operation of unit PR, the pressure difference in the outputs 27 and 28 will be proportional to the difference between the two inputs at 29 and 30.

For purposes of specific example, it is assumed that the time averaged pressure signal at input port 29 is greater than the bias pressure signal applied at input port 30. In other words, it is assumed that actual car speed is higher than the desired speed. Since this results in a proportionally greater pressure at output port 27 than at port 28, flip-flop unit FF is conditioned to pressurize its output port 35. This occurs since the input signal at 32 is proportionally greater than the input signal at 33. The application of the output signal from port 35 of unit FF to input port 39 of unit ON causes this latter unit to operate to pressurize its output port 37, which is the OR output. The output signal from unit ON at port 37 is used to actuate, in any conventional manner, speed control apparatus to cause a reduction in the car speed to obtain the desired leaving speed.

As the speed of the car reduces, the frequency of the pulses received by tube 18 and thus the frequency of the output pulses from unit OS decreases, which results in a reduction in the pressure level of the time averaged output signal from filter FI. This changes the balance between the input signals at unit PR so that the output signal at 27 gradually reduces proportional to the output at 28. When the output pressure from unit FI becomes less than the bias pressure signal from source 19B, the proportion between the signals at outputs 27 and 28 is so changed that unit FF operates to pressurize its output port 34 rather than output port 35. Removal of the signal from output port 35 and thus from input 39 of unit ON deactivates the gate unit so that it returns to its normal condition under which output port 36 is pressurized but there is no output at port 37. The removal of the output signal at port 37 and thus from the speed control apparatus interrupts the control of the car speed. In other words, the car runs free at its existing speed. This condition continues as long as the car speed is equal to or lower than the desired speed.

The arrangement of my invention thus provides a relatively simple and efficient means for determining the level of vehicle speed as compared with a preselected speed level. The logic circuitry elements are all conventional and commercially available and thus less expensive than unique apparatus specifically designed for a particular purpose. The interface or transducer element of the system between the vehicle and the logic circuitry converts vehicle movement into a rotary motion which is proportional to the vehicle speed which is then translated into a pulsed signal form useable in the logic circuitry. This transducer arrangement is not a large and cumbersome installation and thus is readily mountable between the rails at the desired location for determining speed. The overall system results in a vehicle speed sensor which is useable where simple speed control systems for a vehicle do not require a highly accurate and closely adjusted speed measurement.

Although I have herein shown and described but one form of a vehicle speed sensor embodying my invention, it is to be understood that changes and modifications within the scope of the appended claims may be made without departing from the spirit and scope of the invention.

Having thus described my invention, what I claim is:

1. A fluidic speed sensor arrangement for determining the speed of a vehicle moving along a fixed right-of-way, comprising in combination,
   a. translating means including a first source of fluid pressure and responsive to the movement of a vehicle along said right-of-way for producing a series of fluidic pulses whose frequency varies directly in accordance with vehicle speed,
   b. a fluidic one-shot multivibrator device connected to receive the fluidic pulses from said translating means and having a preset timing period to transform such pulses into a series of fluidic pulses of uniform duration independent of frequency,
   c. filter means connected for receiving and converting said uniform duration pulses into a time averaged fluid pressure signal having a pressure level directly proportional to vehicle speed,
   d. another source of fluid pressure for providing a bias pressure signal having a selected level representative of a desired vehicle speed along said right-of-way,
   e. a fluidic proportional amplifier connected for separately receiving as inputs said time averaged fluid pressure signal and said bias pressure signal and further connected to said first fluid pressure source for producing two output pressure signals proportionally divided in response to the relative pressure levels of the two input signals,
   f. a fluidic flip-flop device connected to receive both output signals from said proportional amplifier and responsive thereto for producing a first or a second fluidic output signal as said time averaged signal or said bias signal has a greater pressure level, respectively, and g. a fluidic OR-NOR device connected for receiving only said first output signal from said flip-flop device and responsive thereto for supplying a first speed control signal for controlling a vehicle to said desired speed, said OR-NOR device otherwise supplying a second output signal.

2. A speed sensor arrangement as defined in claim 1 in which said filter means is a fluidic ladder type filter unit.

3. A speed sensor arrangement as defined in claim 2 in which said right of way is a railroad track, said vehicle is a railroad car, and said translating means further comprises, a. a pair of sprocket wheels driven by a sprocket chain having brackets mounted thereon to contact a selected part of each car moving along said track for rotating said wheels at a speed proportional to car speed, one of said wheels being slotted in a predetermined manner, b. an emitter and collector tube arrangement connected to said first source and mounted for transmitting the pressurized fluid from said emitter to said collector tube through said wheel slots for producing said series of fluid pressure pulses having a pulse frequency rate varying directly as car speed.

* * * * *